Figure 1:
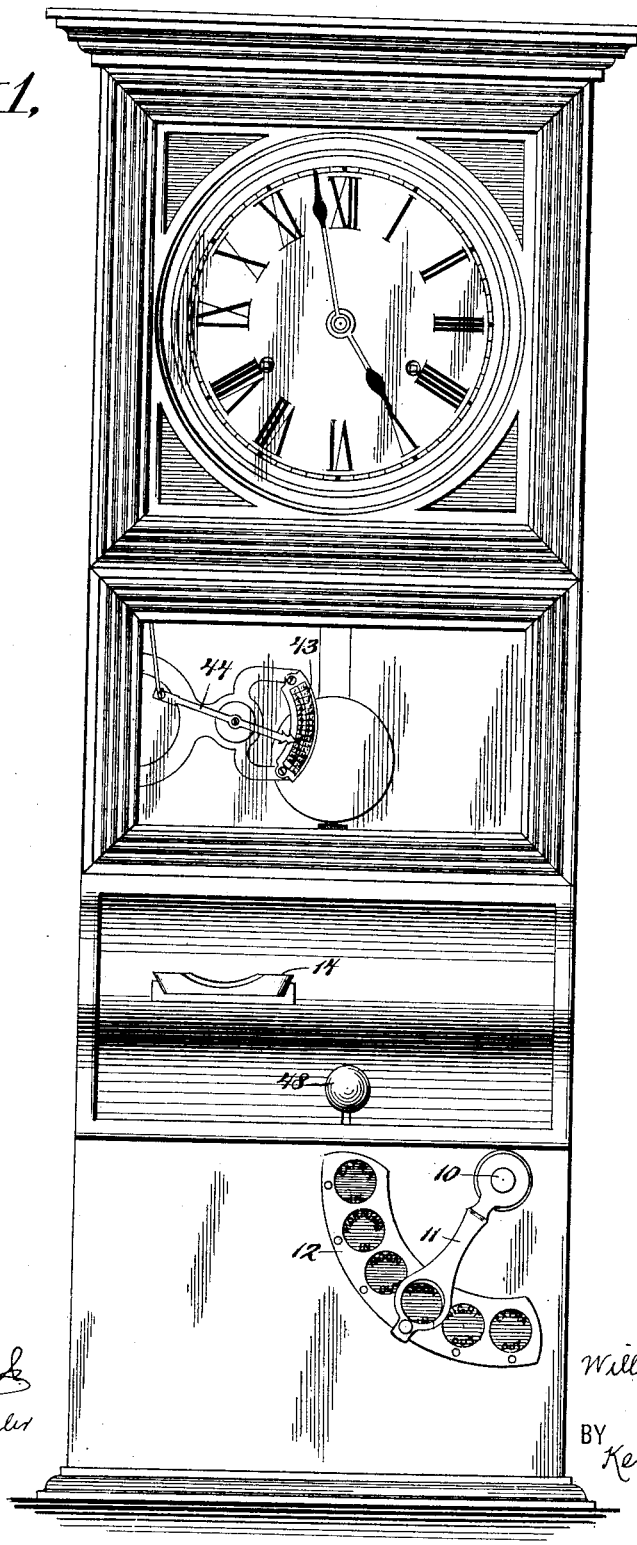

No. 671,129. Patented Apr. 2, 1901.
W. LE G. BUNDY.
WORKMAN'S TIME RECORDER.
(Application filed Oct. 25, 1899.)

(No Model.) 7 Sheets—Sheet 1.

WITNESSES:

INVENTOR
Willard Le Grand Bundy
BY
Kenyon & Kenyon
ATTORNEYS

No. 671,129. Patented Apr. 2, 1901.
W. LE G. BUNDY.
WORKMAN'S TIME RECORDER.
(Application filed Oct. 25, 1899.)
(No Model.) 7 Sheets—Sheet 2.

WITNESSES:

INVENTOR
Willard Le Grand Bundy
BY
Kenyon & Kenyon
ATTORNEYS

No. 671,129. Patented Apr. 2, 1901.
W. LE G. BUNDY.
WORKMAN'S TIME RECORDER.
(Application filed Oct. 25, 1899.)
(No Model.) 7 Sheets—Sheet 3.
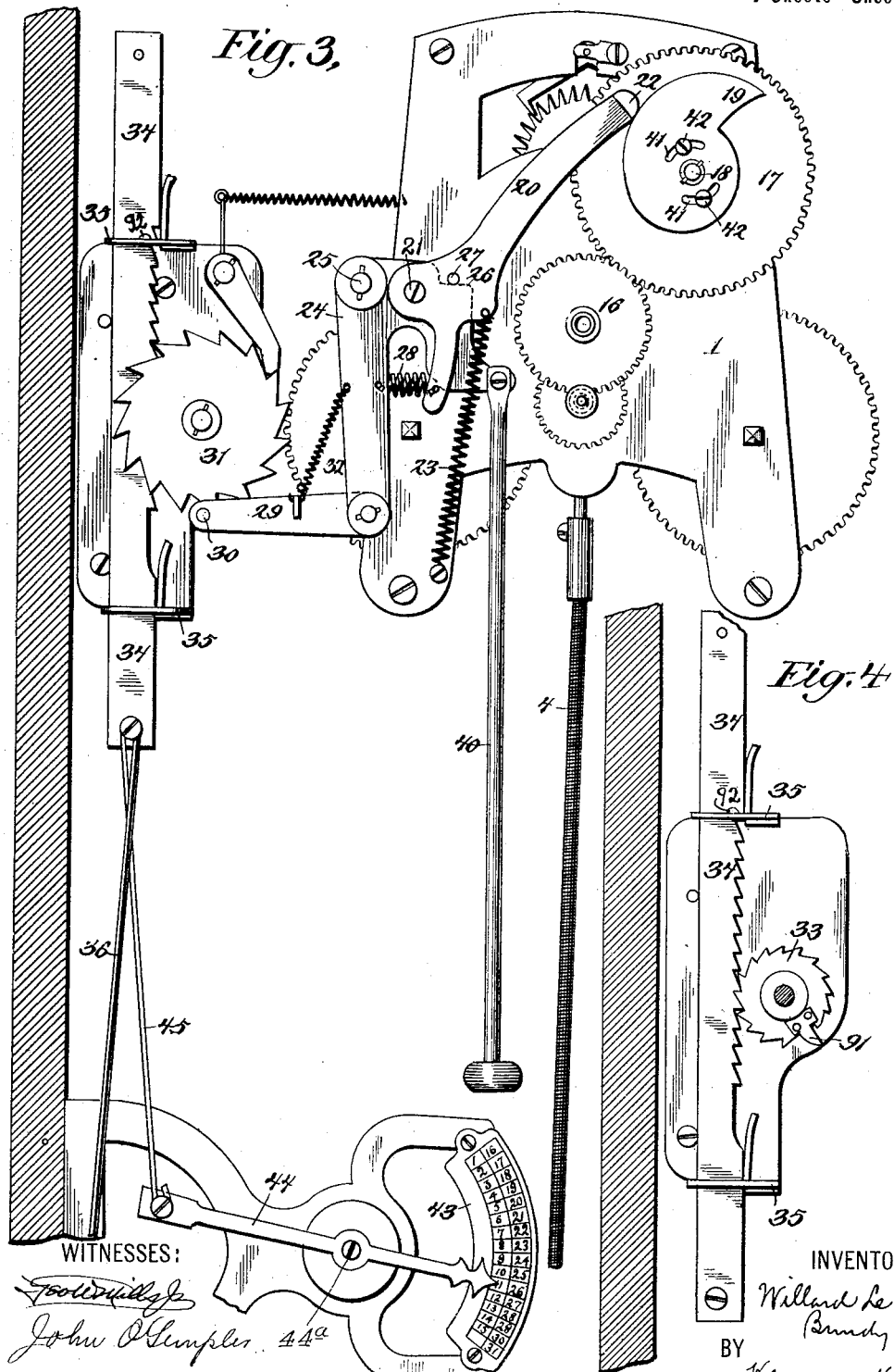
WITNESSES:
INVENTOR
Willard Le Grand Bundy
BY
Kenyon & Kenyon
ATTORNEYS

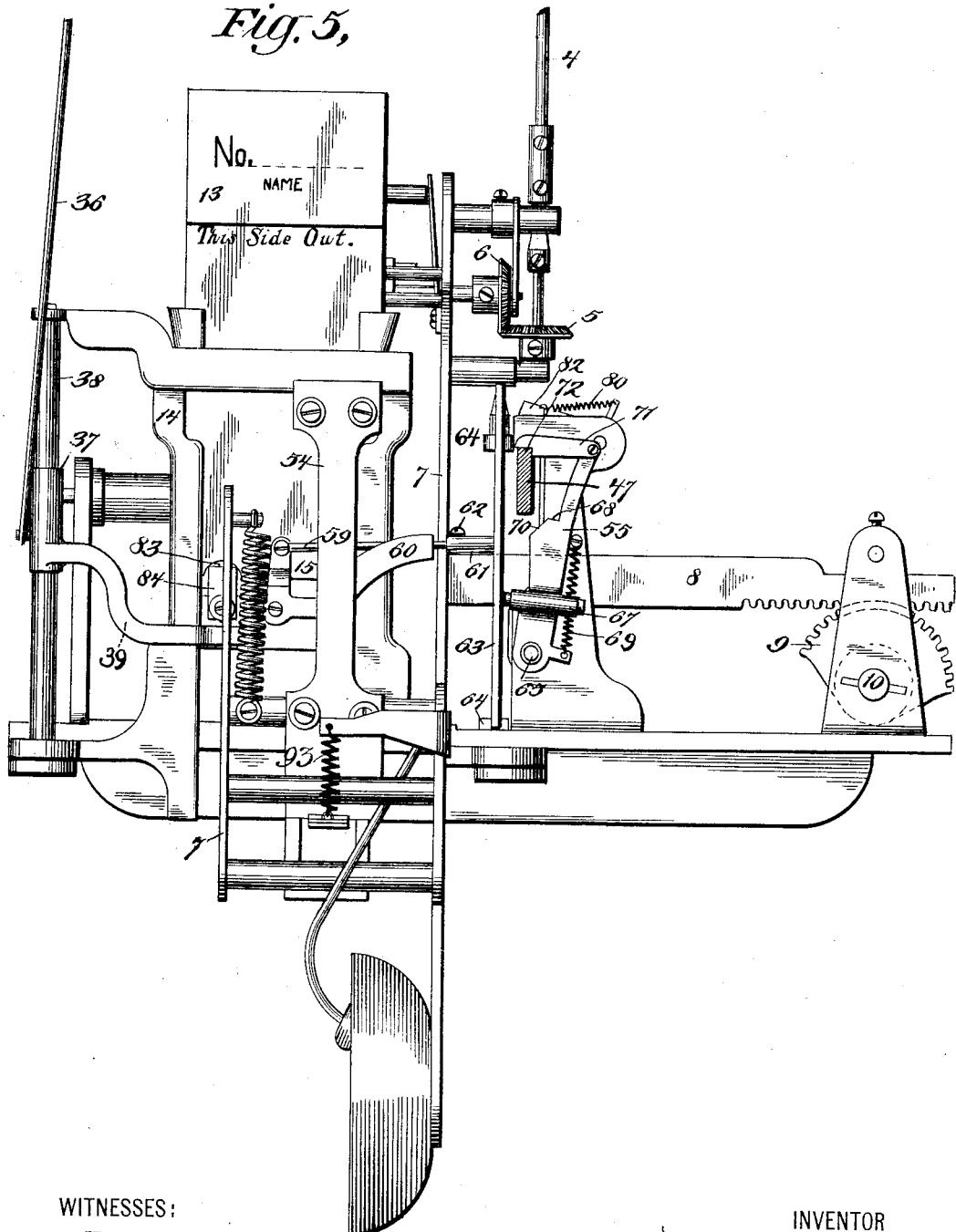

No. 671,129. Patented Apr. 2, 1901.
W. LE G. BUNDY.
WORKMAN'S TIME RECORDER.
(Application filed Oct. 25, 1899.)
(No Model.) 7 Sheets—Sheet 5.
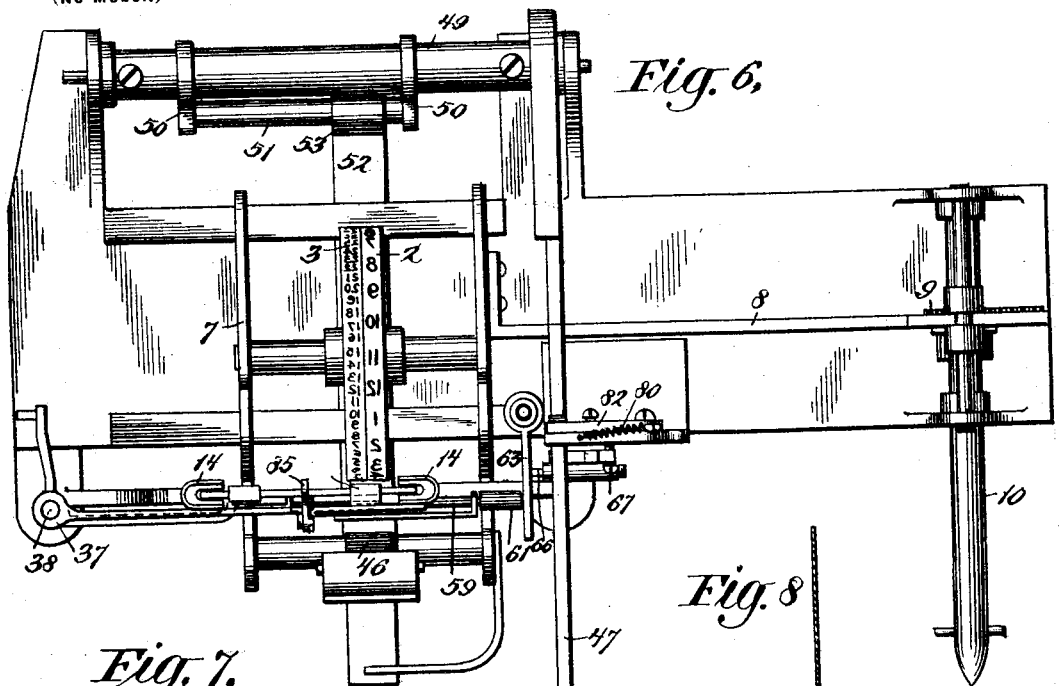
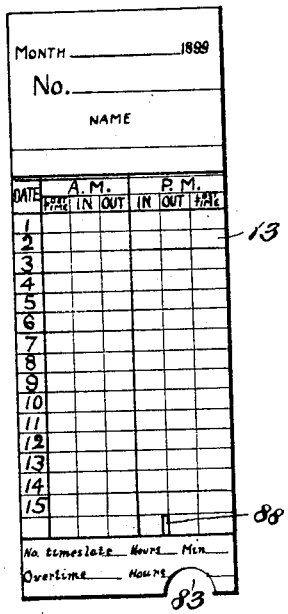
WITNESSES:
INVENTOR
Willard Le Grand Bundy
BY
Kenyon & Kenyon
ATTORNEYS No. 671,129. Patented Apr. 2, 1901.
W. LE G. BUNDY.
WORKMAN'S TIME RECORDER.
(Application filed Oct. 25, 1899.)
(No Model.) 7 Sheets—Sheet 6.
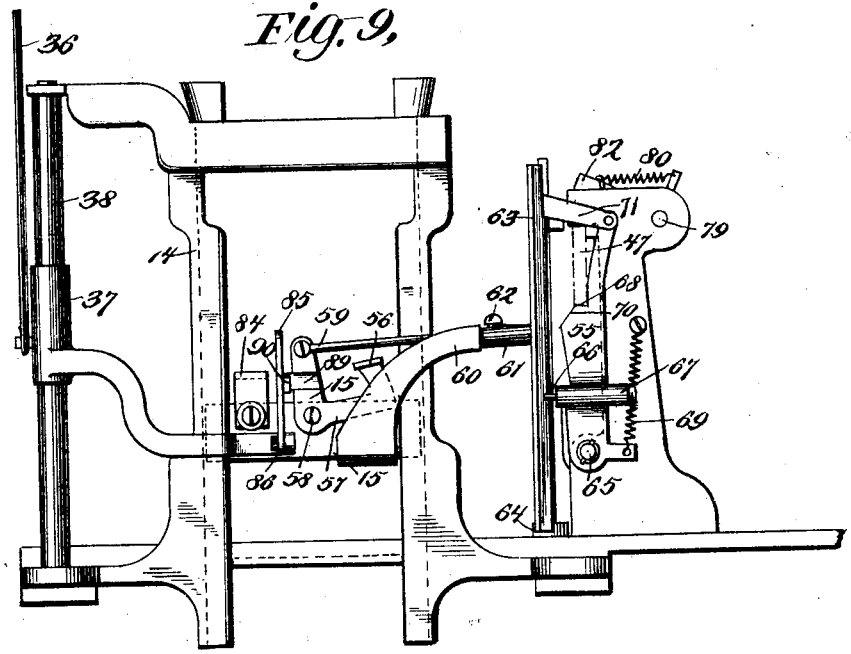
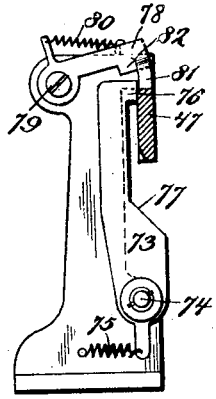 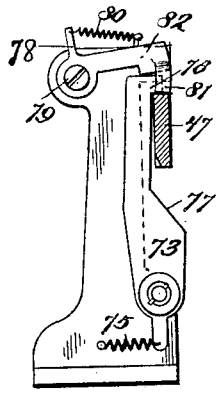 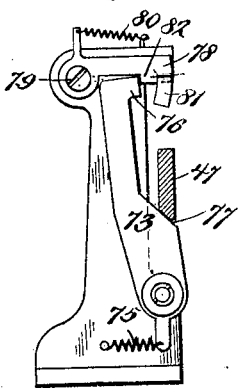
WITNESSES: INVENTOR
Willard Le Grand Bundy
BY
Kenyon & Kenyon
ATTORNEYS No. 671,129. Patented Apr. 2, 1901.
W. LE G. BUNDY.
WORKMAN'S TIME RECORDER.
(Application filed Oct. 25, 1899.)
(No Model.) 7 Sheets—Sheet 7.

WITNESSES:
Sidney Mann
John O Gempler

INVENTOR
Willard LeGrand Bundy
BY
Kenyon & Kenyon
his ATTORNEYS.

UNITED STATES PATENT OFFICE.

WILLARD LE GRAND BUNDY, OF BINGHAMTON, NEW YORK, ASSIGNOR TO THE BUNDY MANUFACTURING COMPANY, OF NEW YORK.

WORKMAN'S TIME-RECORDER.

SPECIFICATION forming part of Letters Patent No. 671,129, dated April 2, 1901.

Application filed October 25, 1899. Serial No. 734,700. (No model.)

*To all whom it may concern:*

Be it known that I, WILLARD LE GRAND BUNDY, a citizen of the United States, and a resident of Binghamton, county of Broome, and State of New York, have invented certain new and useful Improvements in Workmen's Time-Recorders, of which the following is a specification.

My invention relates to recorders, and particularly to time-recorders adapted to make an impression of the time upon a removable card or other suitable record-surface.

It has for its object to provide means for preventing the actuation of the impression mechanism until after the card or other removable record-surface has been properly inserted into the machine and for releasing the impression mechanism when the card or other record-surface has been properly inserted to permit a record to be made upon the card or other record-surface; also, for preventing the incomplete operation of the impression mechanism; also, for preventing the removal of the card or other record-surface after its insertion into the machine until the impression has been made upon the card or other record-surface; also, to provide a new and improved record-card for use in a recorder; also, to improve the mechanism by which a clock-movement imparts vertical movement to the card or other record-surface.

It consists of the novel devices herein shown and described.

In the drawings accompanying this specification and forming part hereof, and in which similar reference characters in the different figures represent corresponding parts, I have shown and will now proceed to describe the preferred form or embodiment of my invention.

Figure 2:
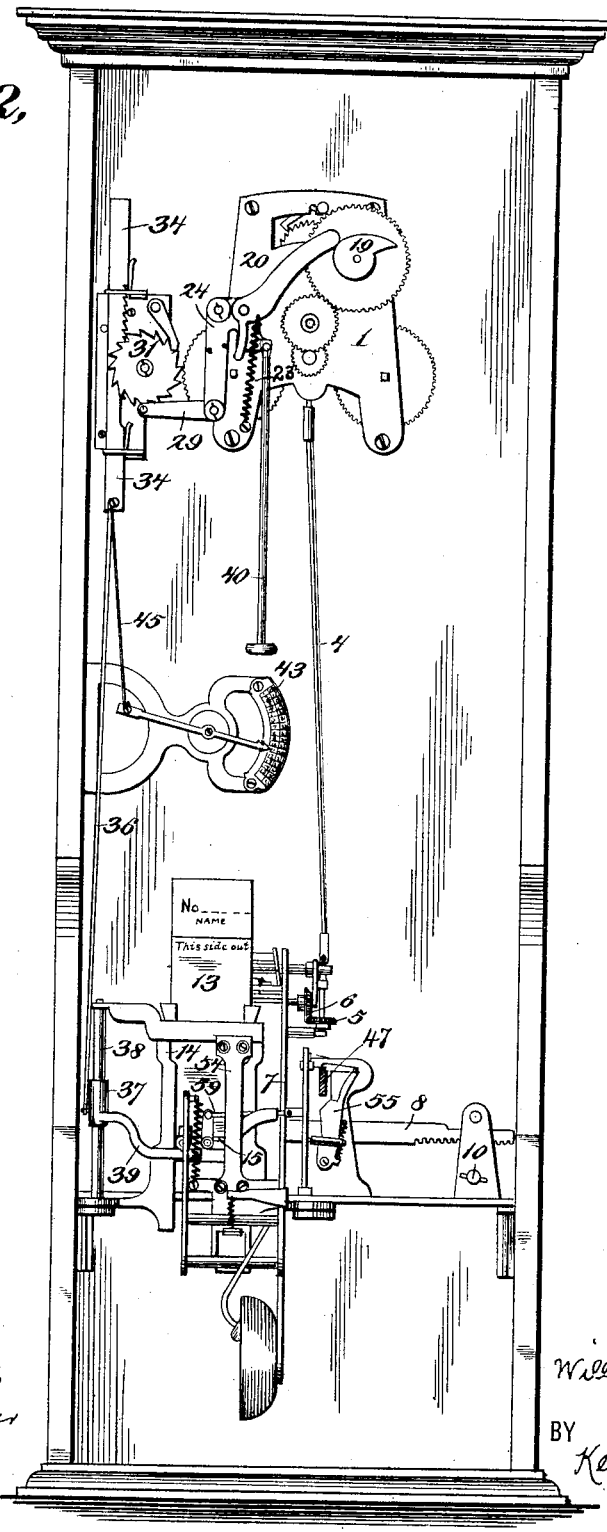
Figure 13:
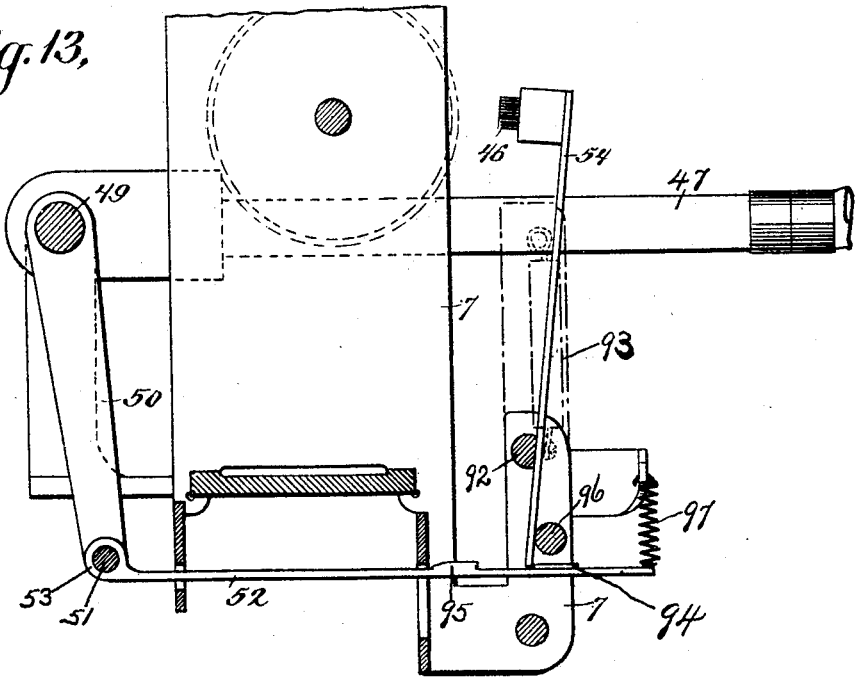
Figure 14:
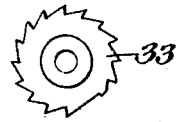

Referring to the drawings, Figure 1 is a front elevation of a time-recorder embodying my invention in its preferred form. Fig. 2 is a front elevation of the same with the casing removed. Fig. 3 is a similar front elevation of part of the same, showing my improved means for imparting vertical movement to the card or other record-surface. Fig. 4 is an end elevation of the rack shown as a portion of Fig. 3, but viewed from the side opposite that of Fig. 3. Fig. 5 is a front elevation of the card-holder with a card inserted and of the surrounding parts. Fig. 6 is a plan of the time-recording mechanism and the means for moving the same horizontally and the means for operating the impression mechanism, some of the parts being omitted for the sake of clearness. Fig. 7 is a view of my improved card in its preferred form. Fig. 8 is a vertical cross-section of my improved catch for preventing the removal of a card from the card-holder. Fig. 9 is a front elevation of my improved device for locking the impression mechanism and for unlocking the same, and Figs. 10, 11, and 12 are details of the said locking and unlocking devices and also the means for locking the impression mechanism after it has begun its movement. Fig. 13 is a side elevation of the mechanism for striking the printing blow. Fig. 14 represents gear-wheel 33, omitting the long tooth 91, so as to show the portion unprovided with teeth.

My invention is shown in the drawings in connection with a time-recorder adapted to print an impression of the time of the operation of the machine upon a removable card or other removable record-surface. My invention may be used, however, in some of its aspects in recording-machines other than time-recorders and in time-recorders varying greatly from the one shown in the drawings.

Referring to the time-recorder shown in the drawings, 1 represents a clock-movement, which may be of any usual construction.

2 and 3 constitute the time-recording mechanism and, as shown, are the hour and minute recording wheels usual in time-recorders. Motion may be imparted from the clock-movement to the time-recording mechanism to drive the latter synchronously with the former by any suitable means. As shown, this motion is transmitted through a flexible spring-shaft 4, connected with the clock-movement and carrying at its lower end a bevel gear-wheel 5, which meshes with bevel gear-wheel 6. Motion is transmitted from the latter bevel-gear to drive the minute and hour recording wheels in the usual manner. As mechanism for this purpose is well known and as it forms no part of the present invention, it is not shown in detail and will not be further described.

The time-recording mechanism is mounted upon a carriage 7, which is adapted to have a horizontal reciprocating movement in the time-recorder. Movement is imparted to the carriage horizontally through a rack-bar 8, meshing with a sector 9, mounted upon shaft 10. Shaft 10 carries at its outer end, outside of the casing of the machine, a handle 11, which is adapted to be moved one way or the other over the face of a dial 12.

13 is my improved card in its preferred form which I prefer to use in connection with a time-recorder. This card, as shown, is arranged with horizontal and vertical columns. The horizontal columns correspond with different days and the vertical columns with different parts of the same day, as A. M. or P. M., or for distinguishing different conditions—as, for example, the entry of workmen or their departure, as marked upon the card by the words "In" and "Out"—and for other purposes—as, for example, for indicating "Lost time."

By moving handle 11 one way or the other across dial 12 the operator can shift the position of the carriage, and with it the time-recording mechanism, so that the latter will register with different vertical columns upon the card as the latter rests in the card-holder.

14 is the card-holder or receptacle for the card. It is composed of a stationary framework and a movable shelf 15. Shelf 15 forms the bottom of the card-holder; but the card is never adapted to rest upon it, even when fully and properly inserted into the card-holder, as will be presently explained. This shelf is made movable vertically in the card-holder and is automatically actuated by the clock-movement at regular stated intervals to bring the different horizontal columns upon the card, when the latter is properly inserted in the card-holder, upon the printing-line, so that the impression will be made upon the horizontal line of the card representing the proper day of the month.

I will now describe the means by which the clock-movement automatically moves the shelf at regular stated intervals and the means by which the shelf is returned to its original position.

In the form of the parts shown in the drawings the shelf is automatically raised by the clock-movement at regular stated intervals and when it reaches the uppermost limit of its travel is automatically and temporarily released from connection with the clock-movement and is at once returned to its lowest position.

16 represents a gear-wheel connected with the hour-wheel of the clock-movement. It meshes with gear 17 on shaft 18. Integrally connected with gear 17 is a cam 19 upon the same shaft.

20 is a lever pivoted at 21 to a second lever 24 and having its nose 22 held against cam 19 by means of spring 23. Lever 24 is pivoted at 25 to the framework of the clock-movement and has a shoulder 26, against which a projection 27 from lever 20 is at times adapted to press. By means of spring 28 a spring or elastic or yielding connection is maintained between levers 20 and 24.

29 is an arm pivoted to lever 24 and carrying at its end a pawl 30, adapted to engage with the teeth of ratchet-wheel 31. A spring 32 tends to hold pawl 30 in mesh with the teeth of ratchet-wheel 31. Upon the same shaft of ratchet-wheel 31 is a gear-wheel 33, rotating therewith and meshing with rack 34, which is free to move vertically in bearings 35, secured to the framework of the machine. A rod 36 runs from the lower end of rack 34 and is connected to a sleeve 37, moving up and down on guide 38 and connected by arm 39 with shelf 15. As cam 19 forces lever 20 upward spring 28 pulls the lower part of lever 24 to the right as viewed in Fig. 3, thus causing pawl 30 to move backward to engage a new tooth of ratchet-wheel 31. When nose 22 falls off from the high to the low part of cam 19, pin 27 strikes shoulder 26, forcing the lower part of lever 24 to the left and feeding ratchet-wheel 31 forward one tooth and moving rack 34 up one tooth, thus raising the shelf a certain prescribed distance. This feeding is automatically repeated at every entire revolution of cam 19. By varying the ratio of gears 16 to 17 the length of time between successive movements of shelf 15 may be varied. As shown, the ratio is as one to two, causing an upward feed of the shelf once in every twenty-four hours. Levers 20 and 24 constitute a compound lever, the connection between the two parts of which is elastic or yielding in one direction and rigid in the other.

40 is a rod secured to lever 24. Whenever it is desired to move shelf 15 upward without waiting for the clock-movement, it can be done by pulling rod 40 downward, thus feeding ratchet-wheel 31 forward and raising the shelf. This is sometimes desirable owing to the difference in the number of days in the different months. Without the elastic connection between the two members of the compound lever this could not be done. The compound lever thus permits of this manual adjustment, while at the same time imparting rigidity to the parts at the time of feeding.

Cam 19 can be delicately adjusted one way or the other upon gear 17 by means of slots 41 in the cam and set-screws 42, projecting through the slots from gear-wheel 17.

43 is a dial provided with two rows of numbers, one row being for the first fifteen days of the month and the other row being for the last fifteen or sixteen days of the month, whichever it may be. The dial 43 has an index-finger 44 pivoted at 44$^a$ and connected by rod 45 to rack 34, so that as rack 34 moves upward or downward it draws rod 45 in the same direction and moves finger 44 over the face of the dial 43 to indicate the position of the shelf upon which the card is supported relative to the day of the month marked upon the card.

By means of the above-described mechanism the carriage, and with it the time-recording mechanism, is movable horizontally and the card is movable vertically in the card-holder, so that any desired position upon the card may be caused to register with the impression mechanism for making an impression upon that space upon the card.

Any suitable impression mechanism and any suitable mechanism for operating it may be employed. In the device shown for this purpose in the drawings, 46 is an impression-platen. It is moved so as to cause the time-recording mechanism to make an impression of the time upon the card by means of an operating-lever 47, having a handle 48 projecting outside of the casing of the machine and adapted to be depressed by the workmen to cause an impression to be made. Any suitable connections between the operating-lever and the impression-platen to transmit the motion of the former to operate the latter may be used, as the details of this mechanism form no part of my invention; but I prefer that form of mechanism shown in Fig. 13, which is operated as follows: The operator presses down upon operating-arm 47, which rocks rock-shaft 49, oscillating arms 50, carrying rod 51, and imparting a to-and-fro movement to strip 52 by means of a sleeve 53, encircling rod 51 and free to move thereon, so that strip 52 can move horizontally with the carriage. Strip 52 is supported at its outer end by spring 97. Arm 54, which carries platen 46, is secured to rod 92, which is movably fixed in plates 7, and is held in its normal position by means of spring 93, (shown in dotted lines in Fig. 13,) which spring is pivoted at one end to the frame of the carriage and to rod 92 at the other end. Strip 52 in its backward movement trips spring-pressed arm 54 by means of a block 94 on strip 52, which engages with arm 54 and draws it backward in opposition to spring 93. It is released from contact with block 94 by means of inclined surface 95 on strip 52 engaging with the opening in the frame of the carriage through which strip 52 passes, thereby depressing strip 52 and releasing arm 54 from engagement with block 94, thereby causing arm 54 to spring forward to deliver the printing blow. Arm 54 is prevented from going forward more than the required distance by means of rod 96, affixed in frame 7 a short distance below and in front of rod 92.

In order to prevent the operator from making an impression before his card has been properly inserted into the card-holder, I provide a lock which normally is adapted to prevent the operation of the impression-operating mechanism and means actuated by the card or other record-surface when properly inserted in place for receiving the impression and for removing the lock from its locking position. My improved mechanism for this purpose can be used in any suitable recording or time-recording machine. In the form shown in the drawings I show a locking-lever 55, which occupies normally a position underneath operating-lever 47 to prevent the depression of that lever and means adapted normally to project into the path of the card as it is inserted into the card-holder and adapted to be struck and moved by the card to remove the lock from operative position to permit the depressions of lever 47. In the preferred form shown in the drawings the unlocking means consist of an abutment 56, which forms one end of a bell-crank lever 57, pivoted at 58 upon shelf 15. A rod 59 is connected to the other end of bell-crank lever 57 and passes through a support 60, also secured to shelf 15, and engages with a sleeve 61, which forms the head of the rod 59. A set-screw 62 enables sleeve 61 to be moved one way or the other on rod 59, so as to adjust the length of rod 59 and sleeve 61. The end of part 61 is adapted to rest against a plate 63. Plate 63 is free to swing horizontally a slight distance on hinges 64 at the rear of the plate. Locking-lever 55 is pivoted at 65 and has a spring-pressed pin 66, fitted in a cylindrical chamber 67 of locking-lever 55. When the abutment 56 is struck and pressed downward by a card either through the weight of the card or by the pressure of the workman upon it, rod 59 presses head 61 against plate 63. The latter presses upon spring 66 and through it forces locking-lever 55 to the right, as shown in Fig. 5, withdrawing shelf 68 of locking-lever 55 from beneath operating-lever 47, permitting the operation of that lever by the workman. Spring 69 tends to hold locking-lever 55 in its locking position. I preferably make the surface of lever 55 just below shelf 68 of a bevel shape, as shown at 70, to enable the operating-lever 47 to force locking-lever 55 farther to the right, if necessary. A notch in an arm 71, pivoted to locking-lever 55, falls over the top of operating-lever 47, as shown at 72, as lock 55 is thrown to the right for the purpose of holding locking-lever 55 in its inoperative or unlocking position until the workman can grasp and depress lever 47 in order to prevent the return of locking-lever 55 to its locking or operative position before the workman can depress lever 47.

As rod 59 moves vertically with shelf 15 pressure-plate 63 and head 61 of rod 59 are always adapted to make contact with each other in whatever position rod 59 may be.

In order to prevent the impression-operating lever from returning to its normal position without completing the operation and making the desired impression, I preferably provide a lock to prevent the withdrawal or return of the impression-operating device after it has commenced its movement and until the same has been completed. In the form shown in the drawings this lock is shown as locking-arm 73, pivoted at 74 and pressed to the right by spring 75. Locking-arm 73 has a catch 76 at its upper end and lower down a beveled edge 77. The catch portion is adapted to normally rest against the side of operating-lever 47, as shown in Fig. 10. When the operating-lever has been slightly depressed, catch 76 will snap above it, as shown in Fig. 11, thus preventing operating-lever 47 from being raised to its normal position. It is permitted to return to its normal position only after making its full stroke, during which the impression is made, and by striking beveled edge 77 of locking-arm 73 toward the close of its movement. When lever 47 strikes beveled edge 77, it forces arm 73 to the left, as shown in Fig. 12, permitting operating-arm 47 to be raised to its normal position. As locking-arm 73 would be moved to the right by spring 75 as soon as lever 47 leaves beveled edge 77, I preferably provide a second lock for seizing and holding the first lock in the inoperative position into which it is moved by lever 47 striking beveled edge 77. As shown, this second lock consists of arm 78, pivoted at 79 and pressed downward by spring 80. It also has two catches 81 and 82. Normally catch 81 lies immediately over lever 47, as shown in Fig. 10. When lever 47 is depressed, catch 81 follows it, holding catch 76 of locking-arm 73 in the position shown in Fig. 11, preventing its further movement to the right. When lever 47 strikes beveled edge 77, forcing locking-arm 73 to the left, catch 82 springs in front of catch 76 and holds it to the left, preventing its return over lever 47 until that lever has risen up to nearly its normal position. As the latter lever rises it strikes catch 81, forcing locking-arm 78 upward and out of its way and permitting locking-arm 73 to return to the position shown in Fig. 10.

The card or other removable record-surface may be brought into contact with the means for unlocking lock 55 in any suitable way and by any suitable means. In practice I prefer, however, to cut away a portion of the card, as at 83, (shown in Fig. 7,) and so arrange the unlocking means and the cut-away portion of the card that the unlocking means will be struck and actuated by the card or other record-surface only when the latter is inserted in the card-holder with the card facing in the proper direction for receiving the impression. This may be accomplished in many different ways; but I prefer to accomplish it by placing in the path of the card a fixed stop, over which the cut-away portion of the card is adapted to fit when the card is properly inserted to allow the card to reach and strike and actuate the said means for removing the lock. In the form shown 84 is the fixed stop. It is mounted upon shelf 15 and moves therewith. When the card is inserted with the face of the card shown in Fig. 7 facing the type on the hour and minute recording wheels, the cut-away portion 83 will fit over stop 84, permitting the card to strike abutment 56 and operate lever 57, as above described, to unlock locking-lever 55 and permit the operation of the impression mechanism. If the card, however, is inserted facing the wrong way or so that the cut-away portion 83 will not register with stop 84, a portion of the card not cut away will strike stop 84 and the card will not strike the abutment 56 or will not move it sufficiently to unlock lever 55. Preferably the cut-away portion is made so that in the position of the parts it will register with abutment 56.

In order to prevent the premature withdrawal by the workman of the card from the card-holder, I preferably provide a catch to engage with the card when inserted in place in the card-holder to prevent the removal of the card and means for automatically removing the catch after the impression has been made to permit the removal of the card. As shown, these devices consist of a catch 85, pivotally mounted at 86 on shelf 15. Catch 85 is adapted through spring 87 to engage with a portion of the card when the card is inserted in position. The catch may engage with any portion of the card, but I prefer in practice to cut a slit 88 in the card through which catch 85 will project when the card has been fully inserted. This will effectually prevent the removal of the card from the card-holder until the impression has been made. Then the catch is automatically removed by means of cam 89 on lever 57, which strikes a projection 90 on catch 85, forcing it out of the slit 88. Normally catch 85 is held out of the path of the card by means of lever 57 and cam 89.

A space upon the periphery of gear-wheel 33, Fig. 14, is left unprovided with teeth, so that when this part comes opposite rack 34 the latter drops to its lowest position, carrying down with it shelf 15. In order to move rack 34 up at the next feeding operation, I provide a long tooth 91, arranged in the said space on wheel 33 unprovided with teeth, and place a pin 92 on rack 34 near one end of the teeth of the rack. Tooth 91 engages with pin 92 and moves the rack upward until the ordinary teeth of ratchet-wheel 33 come into mesh with the teeth of rack 34.

By means of my invention the workman is prevented from operating the recording mechanism until his card has been properly inserted in place with the card facing in the right direction and inserted to the full extent to properly receive the impression, and after having once inserted his card he is unable to withdraw it or to return the impression-operating device to its normal position until he has properly operated the machine and made the proper impression upon the card. The shelf can also be manually moved to the proper position without the necessity of taking the mechanism, or part of it, to pieces.

Many changes and modifications from the form of devices shown in the drawings can be made without departing from my invention.

Parts of my improved devices shown, but not claimed herein, are shown and claimed in an application filed by me simultaneously herewith and known as "Serial No. 734,699."

What I claim as new, and desire to secure by Letters Patent, is—

1. In a recorder adapted to make a record upon a card or other removable record-surface, the combination with suitable recording mechanism and suitable impression mechanism and means for actuating it, of a lock adapted to prevent the operation of the impression mechanism, and means actuated by the card or other record-surface, when properly inserted in place in the machine, for removing the lock from its locking position to permit the operation of the impression mechanism, whereby the recording mechanism cannot be operated to make an impression until the card or other record-surface has been properly inserted in place to receive the impression.

2. In a recorder adapted to make a record upon a card or other removable record-surface, the combination with suitable recording mechanism and suitable impression mechanism and means for actuating it, of a lock adapted to prevent the operation of the impression mechanism, a card or other removable record-surface having a portion cut away, and means, adapted to be struck and actuated by the card or other record-surface only when the latter is properly inserted in the machine with the cut-away portion of the card in its proper position in the card-holder, for removing the lock from its locking position to permit the operation of the impression mechanism, whereby the recording mechanism cannot be operated to make an impression until the card or other record-surface has been properly inserted in place to receive the impression.

3. In a recorder adapted to make a record upon a card or other removable record-surface the combination with suitable recording mechanism and suitable impression mechanism and means for actuating it, of a lock adapted to prevent the operation of the impression mechanism, a card or other removable record-surface having a portion cut away, means for removing the lock from its locking position to permit the operation of the impression mechanism, a stop in the bottom of the card-holder over which the cut-away portion of the card is adapted to fit when the card is properly inserted, to allow the card to reach the bottom of the card-holder and to strike and actuate the said means for removing the lock, but against which stop the card will strike, when inserted in the receiver in the wrong way, to prevent the actuation of said unlocking means, whereby the recording mechanism cannot be operated to make an impression until the card or other record-surface has been properly inserted in place to receive the impression.

4. In a time-recorder adapted to make a record upon a card or other removable record-surface, the combination with suitable time-recording mechanism and means for driving it and suitable impression mechanism and means for actuating it, of a lock adapted to prevent the operation of the impression mechanism, and means actuated by the card or other record-surface, when properly inserted in place in the machine, for removing the lock from its locking position to permit the operation of the impression mechanism, whereby the recording mechanism cannot be operated to make an impression until the card or other record-surface has been properly inserted in place to receive the impression.

5. In a time-recorder adapted to make a record upon a card or other removable record-surface the combination with suitable time-recording mechanism and means for driving it and suitable impression mechanism and means for actuating it, of a lock adapted to prevent the operation of the impression mechanism, a card or other removable record-surface having a portion cut away, and means, adapted to be struck and actuated by the card or other record-surface only when the latter is properly inserted in the machine with the cut-away portion of the card in its proper position in the card-holder, for removing the lock from its locking position to permit the operation of the impression mechanism, whereby the recording mechanism cannot be operated to make an impression until the card or other record-surface has been properly inserted in place to receive the impression.

6. In a time-recorder adapted to make a record upon a card or other removable record-surface the combination with suitable time-recording mechanism and means for driving it and suitable impression mechanism and means for actuating it, of a lock adapted to prevent the operation of the impression mechanism, a card or other removable record-surface having a portion cut away, means for removing the lock from its locking position to permit the operation of the impression mechanism, a stop in the bottom of the card-holder over which the cut-away portion of the card is adapted to fit when the card is properly inserted to allow the card to reach the bottom of the card-holder and to strike and actuate the said means for removing the lock, but against which stop the card will strike, when inserted in the receiver in the wrong way, to prevent the actuation of said unlocking means, whereby the recording mechanism cannot be operated to make an impression until the card or other record-surface has been properly inserted in place to receive the impression.

7. In a recorder adapted to make a record upon a card or other removable record-surface the combination with suitable recording mechanism and suitable impression mechanism, of an impression-operating device, a lock adapted to engage with the impression-operating device to prevent the operation of the impression mechanism, a card-holder adapted to receive and hold the card or other record-surface, a shelf movable therein and adapted to form a floor or support for the card or other record-surface, means for moving the shelf in the card-holder, a lever mounted upon the shelf and having a part projecting into the card-holder adapted to be struck and moved by the card or other record-surface when the latter is properly inserted in the card-holder, a plate suitably supported and adapted to move so as to strike against the lock to remove the same from operative position, a part connected with the lever, which projects into the card-holder, and adapted to move over the face of the plate as the shelf is moved in the card-holder and to press against the plate when the said lever is moved by the card, whereby the recording mechanism cannot be operated to make an impression until the card or other record-surface has been properly inserted in place in the card-holder and whereby upon such insertion the lock will be removed to free the impression mechanism irrespective of the position of the shelf in the card-holder.

8. In a recorder adapted to make a record upon a card or other removable record-surface the combination with suitable recording mechanism and suitable impression mechanism, of an impression-operating device, a lock adapted to engage with the impression-operating device to prevent the operation of the impression mechanism, a card-holder adapted to receive and hold the card or other record-surface, a shelf movable therein and adapted to form a floor or support for the card or other record-surface, means for moving the shelf in the card-holder, a lever mounted upon the shelf and having a part projecting into the card-holder adapted to be struck and moved by the card or other record-surface when the latter is properly inserted in the card-holder, a plate suitably supported and adapted to move so as to strike against the lock to remove the same from operative position, a part connected with the lever, which projects into the card-holder, and adapted to move over the face of the plate as the shelf is moved in the card-holder and to press against the plate when the said lever is moved by the card, whereby the recording mechanism cannot be operated to make an impression until the card or other record-surface has been properly inserted in place in the card-holder and whereby upon such insertion the lock will be removed to free the impression mechanism irrespective of the position of the shelf in the card-holder, and means for returning the parts to their original positions.

9. In a recorder adapted to make a record upon a card or other removable record-surface the combination with suitable recording mechanism and suitable impression mechanism, of an impression-operating device, a lock adapted to engage with the impression-operating device to prevent the operation of the impression mechanism, a card-holder adapted to receive and hold the card or other record-surface, a shelf movable therein and adapted to form a floor or support for the card or other record-surface, means for moving the shelf in the card-holder, a lever mounted upon the shelf and having a part projecting into the card-holder adapted to be struck and moved by the card or other record-surface when the latter is properly inserted in the card-holder, a plate suitably supported and adapted to move so as to strike against the lock to remove the same from operative position, a rod secured to the lever which projects into the card-holder, an adjustable head secured to the end of said rod adapted to be adjusted upon the rod to increase or decrease the length of the rod and head and adapted to bear upon said plate and to move over the face of the same as the shelf moves in the card-holder and to press against the said plate when the lever is moved by the card, whereby the recording mechanism cannot be operated to make an impression until the card or other record-surface has been properly inserted in place in the card-holder and whereby upon such insertion the lock will be removed to free the impression mechanism irrespective of the position of the shelf in the card-holder.

10. In a recorder adapted to make a record upon a card or other removable record-surface, the combination with suitable recording mechanism and suitable impression mechanism and means for actuating it, of a lock adapted to prevent the operation of the impression mechanism, and means actuated by the card or other record-surface, when the latter is properly inserted in place in the machine, for removing the lock from its locking position to permit the operation of the impression mechanism, a catch connected with the lock adapted to hold the lock in its inoperative position when moved thereto and for preventing its return to its normal position before the workman has operated the means for actuating the impression mechanism, whereby the recording mechanism cannot be operated to make an impression until the card or other record-surface has been properly inserted in place to receive the impression.

11. In a recorder adapted to make a record upon a card or other removable record-surface, the combination with suitable recording mechanism and suitable impression mechanism, of an impression-operating lever, a lock adapted to prevent the operation of the said lever, means actuated by the card or other record-surface when properly inserted in place in the machine for removing the lock from its locking position to permit the operation of the impression-operating lever, a catch secured to the lock and adapted when the latter is moved into its inoperative position to engage with the impression-operating lever to hold the lock in its inoperative position until the movement of the impression-operating lever has been begun, whereby the recording mechanism cannot be operated to make an impression until the card or other record-surface has been inserted in place to receive the impression and whereby the lock cannot return to its locking position before the movement of the impression-operating lever has been begun.

12. In a recorder the combination with suitable impression mechanism and an impression-operating lever, of a locking-arm adapted to engage with the impression-operating lever, after it has commenced its movement to operate the impression mechanism, to prevent the withdrawal or return of the impression-operating device without making an impression, a spring for moving the locking-arm into its operative or locking position when the impression-operating device begins its movement, a part connected with the locking-arm and adapted to be struck by the impression-operating lever toward the end of its stroke to remove the locking-arm from its locking position, whereby the impression-operating device cannot be returned to its original position after it has begun the movement, until an impression has been made.

13. In a recorder the combination with suitable impression mechanism and an impression-operating device, of a locking-arm adapted to engage with the impression-operating device, after it has commenced its movement to operate the impression mechanism, to prevent the withdrawal or return of the impression-operating device without making an impression, a spring for moving the locking-arm into its operative or locking position when the impression-operating device begins its movement, a part connected with the locking-arm and adapted to be struck by the impression-operating device toward the end of its stroke to remove the locking-arm from its locking position, whereby the impression-operating device cannot be returned to its original position after it has begun the movement, until an impression has been made, a second lock for seizing and holding the first lock after it has been removed from its operative or locking position, until the impression-operating device is returned substantially to its original position, and means for removing the second lock and for holding it out of operative position.

14. In a recorder the combination with impression-operating mechanism and an impression-operating device, of a lock adapted to prevent the withdrawal or return of the impression-operating device after it has commenced its movement until the same has been completed and an impression has been made, means for automatically putting the lock into operative position when the impression-operating device begins its movement, and means for automatically removing the lock from operative position, automatically actuated by the impression-operating device near the end of its movement, a second lock for seizing and holding the first lock after it has been removed from its operative or locking position, until the impression-operating device is returned substantially to its original position, and means for holding it out of operative position.

15. In a recorder the combination with suitable impression mechanism and an impression-operating device, of a locking-arm adapted to engage with the impression-operating device after it has commenced its movement to operate the impression mechanism, to prevent the withdrawal or return of the impression-operating device without making an impression, a spring for moving the locking-arm into its operative or locking position when the impression-operating device begins its movement, a part connected with the locking-arm and adapted to be struck by the impression-operating device toward the end of its stroke to remove the locking-arm from its locking position, whereby the impression-operating device cannot be returned to its original position after it has begun the movement, until an impression has been made.

16. In a recorder the combination with suitable impression mechanism and an impression-operating device, of a locking-arm adapted to engage with the impression-operating device, after it has commenced its movement to operate the impression mechanism, to prevent the withdrawal or return of the impression-operating device without making an impression, a spring for moving the locking-arm into its operative or locking position when the impression-operating device begins its movement, a part connected with the locking-arm and adapted to be struck by the impression-operating device toward the end of its stroke to remove the locking-arm from its locking position, whereby the impression-operating device cannot be returned to its original position after it has begun the movement, until an impression has been made, a second lock for seizing and holding the first lock after it has been removed from its operative or locking position, until the impression-operating device is returned substantially to its original position, and means for holding the first lock out of operative position.

17. In a recorder the combination with suitable impression mechanism and an impression-operating device, of a locking-arm adapted to engage with the impression-operating device, after it has commenced its movement to operate the impression mechanism, to prevent the withdrawal or return of the impression-operating device without making an impression, a spring for moving the locking-arm into its operative or locking position when the impression-operating device begins its movement, a part connected with the locking-arm and adapted to be struck by the impression-operating device toward the end of its stroke to remove the locking-arm from its locking position, whereby the impression-operating device cannot be returned to its original position after it has begun the movement, until an impression has been made, a second lock having two catches one of which is adapted to rest normally upon the impression-operating device and as the latter commences its movement to move with it and to catch and hold the locking-arm after it has engaged with the impression-operating device, to prevent excessive movement of the said locking-arm, the second catch adapted to seize and hold the locking-arm after it has been removed from its operative or locking position to permit the impression-operating device to return to its normal position, whereby the locking-arm will be prevented from excessive movement and will be held out of the path of the impression-operating device on its return stroke and whereby the second lock will be returned to its normal position by the impression-operating device as it returns to its normal position.

18. In a time-recorder the combination of a clock-movement, time-recording mechanism driven synchronously thereby, a card-holder adapted to receive and hold a card or other suitable removable record-surface, suitable impression mechanism for causing the time-recording mechanism to make impressions of the time upon a card or other record-surface, means for actuating the impression mechanism, a shelf in the card-holder adapted to move vertically therein and to form a support for the card or other record-surface, whereby different horizontal spaces on the card may be brought into register with the printing-line, connections between the clock-movement and the shelf for automatically and intermittently moving the shelf vertically in the card-holder, the said connections including a cam connected with and driven by the clock-movement, a compound lever consisting of two separate levers, one actuated by the cam and the other lever adapted to actuate mechanism for intermittently feeding the shelf, the said levers being connected by a yielding connection in one direction and a rigid connection in the other, whereby when the feeding operation takes place, the connection between the two levers is rigid and when the second lever is moved by the first lever into position to feed the connections are yielding.

19. In a time-recorder the combination of a clock-movement, time-recording mechanism driven synchronously thereby, a card-holder adapted to receive and hold a card or other suitable record-surface, suitable impression mechanism for causing the time-recording mechanism to make impressions of the time upon a card or other record-surface, means for actuating the impression mechanism, a shelf in the card-holder adapted to move vertically therein and to form a support for the card or other record-surface, whereby different horizontal spaces on the card may be brought into register with the printing-line, connections between the clock-movement and the shelf for automatically and intermittently moving the shelf vertically in the card-holder, the said connections including a cam connected with and driven by the clock-movement, a compound lever consisting of two separate levers, one actuated by the cam and the other lever adapted to actuate mechanism for intermittently feeding the shelf, the said levers being connected by a yielding connection in one direction and the rigid connection in the other, whereby, when the feeding operation takes place, the connection between the two levers is rigid and, when the second lever is moved by the first lever into position to feed, the connections are yielding, an arm connected with the second lever adapted to be operated manually for feeding the shelf independently of the clock-movement.

20. In a recorder adapted to print upon a card or other removable record-surface the combination of a card or other record-surface, a catch adapted to engage therewith when the card or other record-surface is inserted in place in the recorder, and means for removing the catch and releasing the card or other record-surface to permit its removal after an impression has been made, whereby the card or other record-surface is locked in position after its insertion and until after the impression has been made.

21. In a recorder adapted to print upon a card or other removable record-surface the combination of a card or other record-surface, a slit therein, a catch adapted to enter said slit to engage with the card or other record-surface when the latter is inserted in place in the recorder, and means for removing the catch from the slit and releasing the card or other record-surface after the impression has been made, whereby the card or other record-surface is locked in position after its insertion and until after the impression has been made.

22. In a recorder adapted to print upon a card or other removable record-surface the combination of a card or other record-surface, a catch adapted to engage therewith when the card or other record-surface is inserted in place in the recorder, and means adapted to be actuated by the impression-operating device after an impression has been made, for removing the catch and releasing the card or other record-surface to permit its removal after an impression has been made, whereby the card or other record-surface is locked in position after its insertion and until after the impression has been made.

23. In a recorder adapted to print upon a card or other removable record-surface the combination of a card or other record-surface, a slit therein, a catch adapted to enter said slit to engage with the card or other record-surface when the latter is inserted in place in the recorder, and means adapted to be actuated by the impression-operating device after an impression has been made for removing the catch from the slit and releasing the card or other record-surface after an impression has been made, whereby the card or other record-surface is locked in position after its insertion and until after the impression has been made.

24. In a recorder adapted to make a record upon a card or other removable record-surface the combination with suitable recording mechanism and suitable impression mechanism and means for actuating it, of a lock adapted to prevent the operation of the impression mechanism, means adapted to be struck by the card or other record-surface, when properly inserted in place in the machine, for removing the lock from its locking position to permit the operation of the impression mechanism, whereby the recording mechanism cannot be operated to make an impression until the card or other record-surface has been properly inserted in place to receive the impression, a catch adapted to engage with the card or other record-surface when the card or other record-surface is inserted in place in the recorder, means for returning the unlocking means to their original position and to strike and release the catch to permit the removal of the card or other record-surface from the machine after an impression has been made, whereby the card or other record-surface is locked in position after its insertion and until after the impression has been made.

25. In a time-recorder the combination of a clock-movement, a part of the mechanism to be automatically and intermittently raised by the clock-movement, connections between the clock-movement and the said part for intermittently raising the latter, the said connection including a pawl and ratchet, a rack raised thereby, said rack being connected with the part to be moved, the ratchet-driving mechanism having a space unprovided with teeth adapted when it comes opposite to the rack to permit the rack and its connecting part to drop to their lowest position, a long tooth upon the ratchet, located at one side of the space unprovided with teeth and a pin upon the rack near the end of the teeth of the same, the said long tooth and pin being adapted to engage to raise the rack at the first feeding after the rack has been dropped to its lowest position, whereby the said long tooth will feed the rack upward until the regular teeth again come into engagement with the teeth of the rack.

26. In a time-recorder the combination of a clock-movement, a card-holder adapted to hold a card or other removable record-surface, a shelf movable vertically in said card-holder and adapted to be automatically and intermittently raised by the clock-movement, connections between the clock-movement and the said shelf for intermittently raising the latter, the said connections including a pawl and ratchet, a rack raised thereby, said rack being connected with the shelf to be moved, the ratchet-driving mechanism having a space unprovided with teeth adapted when it comes opposite to the rack to permit the rack and its connecting shelf to drop to their lowest position, a long tooth upon the ratchet located at one side of the space unprovided with teeth and a pin upon the rack, near the end of the teeth of the same, the said long tooth and pin being adapted to engage to raise the rack at the first feeding after the rack has been dropped to its lowest position, whereby the said long tooth will feed the rack upward until the regular teeth again come into engagement with the teeth of the rack.

In testimony whereof I have signed my name to this specification in the presence of two subscribing witnesses.

WILLARD LE GRAND BUNDY.

Witnesses:
JOSHUA W. CAPEN,
A. WARD FORD.